(12) United States Patent
Pearson

(10) Patent No.: US 6,185,882 B1
(45) Date of Patent: Feb. 13, 2001

(54) BULLET RESISTANT WINDOW ASSEMBLY

(76) Inventor: Gregory M. Pearson, P.O. Box 262, New Carlisle, OH (US) 45344

( * ) Notice: Under 35 U.S.C. 154(b), the term of this patent shall be extended for 0 days.

(21) Appl. No.: 09/396,123

(22) Filed: Sep. 14, 1999

Related U.S. Application Data

(63) Continuation-in-part of application No. 08/901,750, filed on Jul. 28, 1997, now Pat. No. 5,950,380.
(51) Int. Cl.[7] ..................................... E06B 3/00
(52) U.S. Cl. ................. 52/204.5; 52/204.6; 52/204.71
(58) Field of Search .................. 52/204.5, 204.6, 52/204.71, 204.62, 204.64, 204.65, 204.72, 211, 204.53, 204.61, 204.68, 656.6, 786.11, 204.54

(56) References Cited

U.S. PATENT DOCUMENTS

| | | |
|---|---|---|
| 2,933,779 | 4/1960 | Deloroche . |
| 3,624,238 | 11/1971 | McKenzie . |
| 3,994,243 | 11/1976 | Anders . |
| 4,543,755 | 10/1985 | Crandell . |
| 4,625,659 | 12/1986 | Saelzer . |
| 5,950,380 | * 9/1999 | Pearson ............................ 52/204.5 |

OTHER PUBLICATIONS

Norshield Security Products 13070/NOR BuyLine 2716, Bullet, Attact & Blast Resistant Windows, p. 3, Montgomery Alabama.

Tubelite 1995, 22.24 401 Series Slope Wall, Vertical 22.2 401 Series Slope Wall, End Wall Transition.

* cited by examiner

Primary Examiner—Jerry Redman
(74) Attorney, Agent, or Firm—Jacox, Meckstroth & Jenkins

(57) ABSTRACT

A rectangular steel frame has a wide peripheral flange integrally connected to a narrow peripheral flange by a web, and a set of spacer bars of predetermined thickness are welded to the narrow flange around the frame. A multiple layer glass unit is positioned within the frame, and a set of trim base strips are secured by peripherally spaced screws to the wide flange and to the spacer bars around the frame for capturing a peripheral portion of the glass unit. Steel reinforcing strips are secured to either or both sets of trim base strips by the screws, and corresponding sets of aluminum trim channels snap-fit onto the base strips around the frame for enclosing the steel reinforcing strips and to provide a neat decorative appearance. The above structure is also used to form a mullion within the window unit or a window frame assembly for a stepped opening in a building wall. Glazing materials extend between each set of trim base strips and the peripheral portion of the window unit.

20 Claims, 4 Drawing Sheets

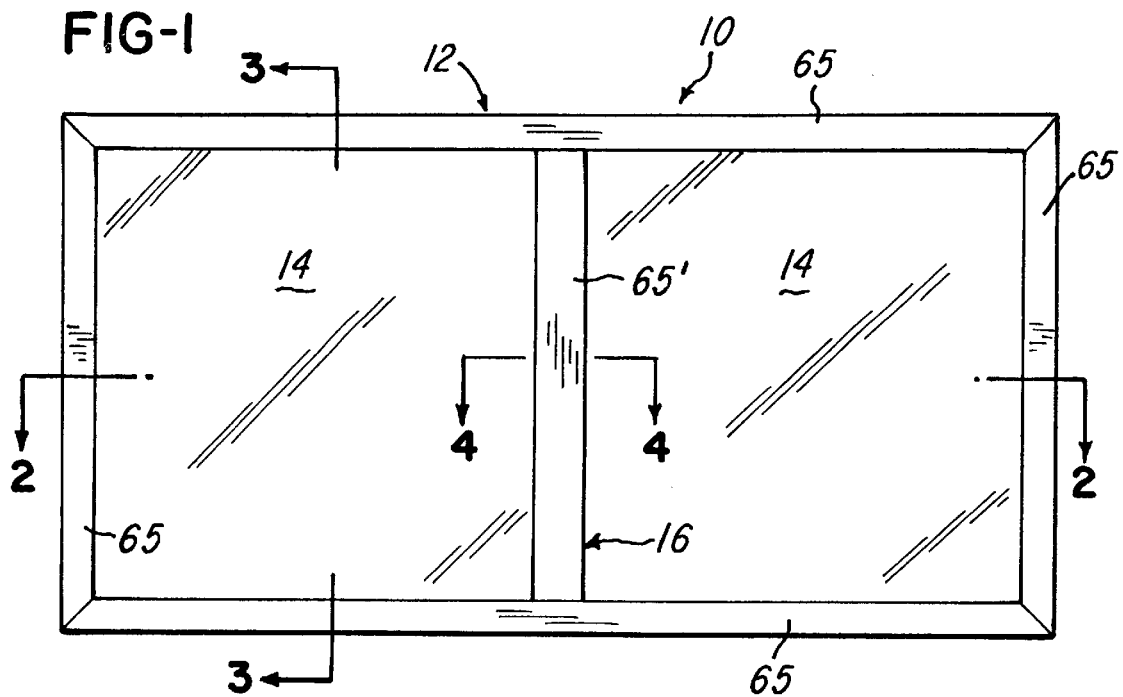
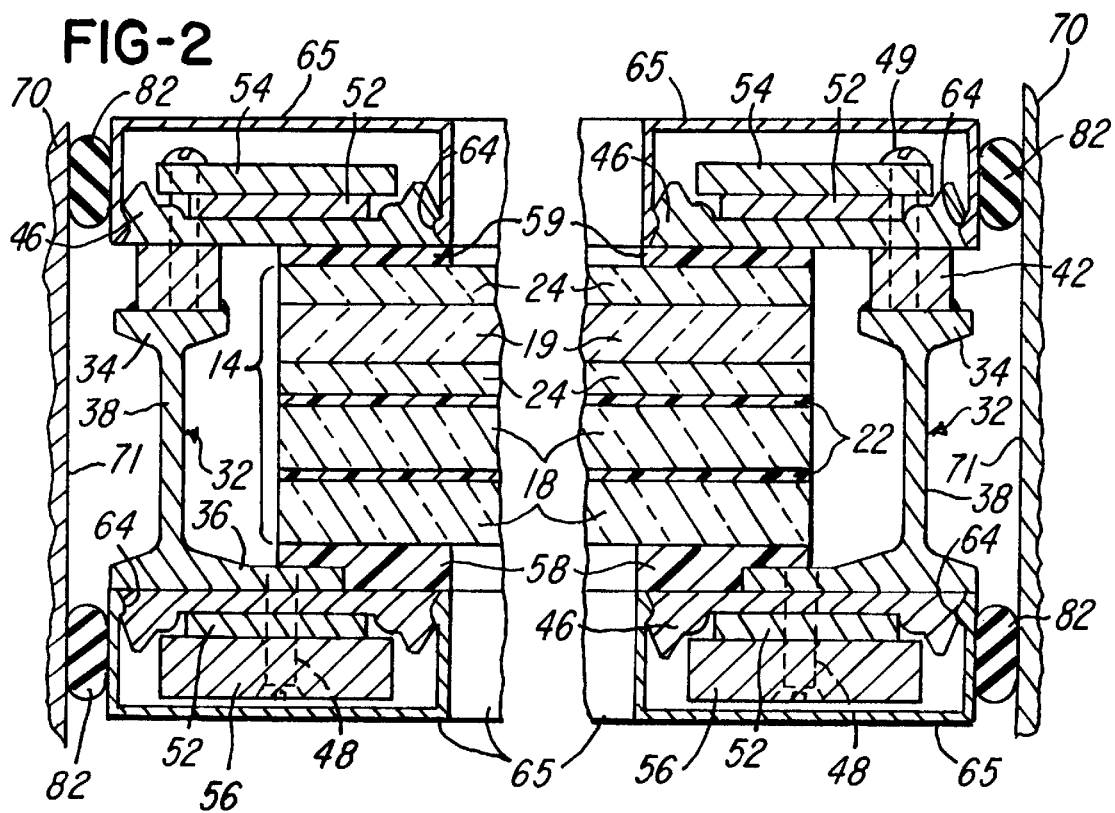

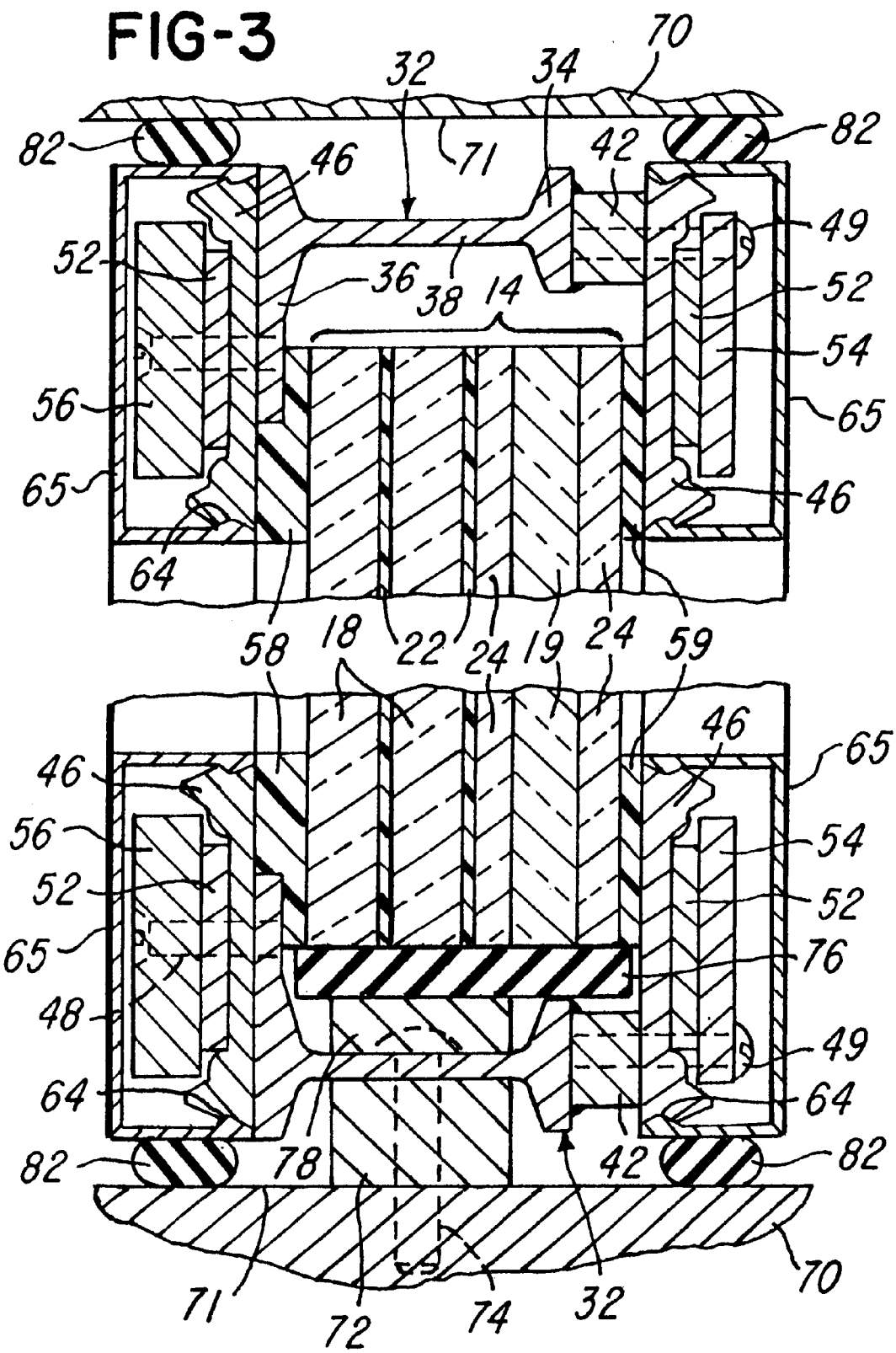

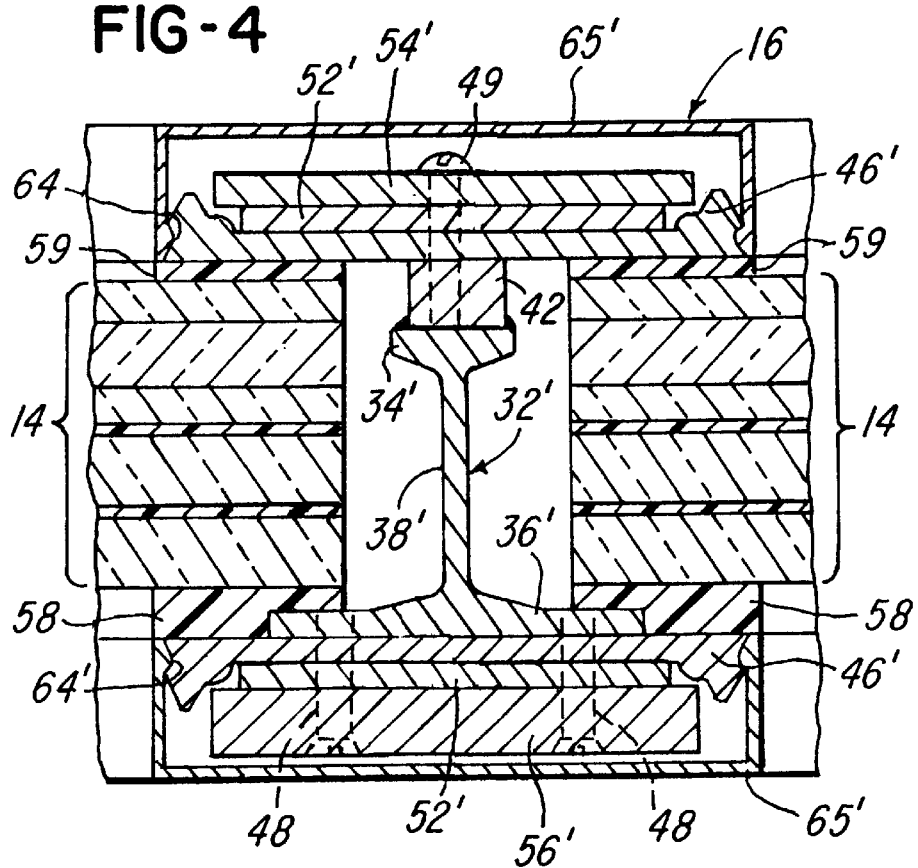
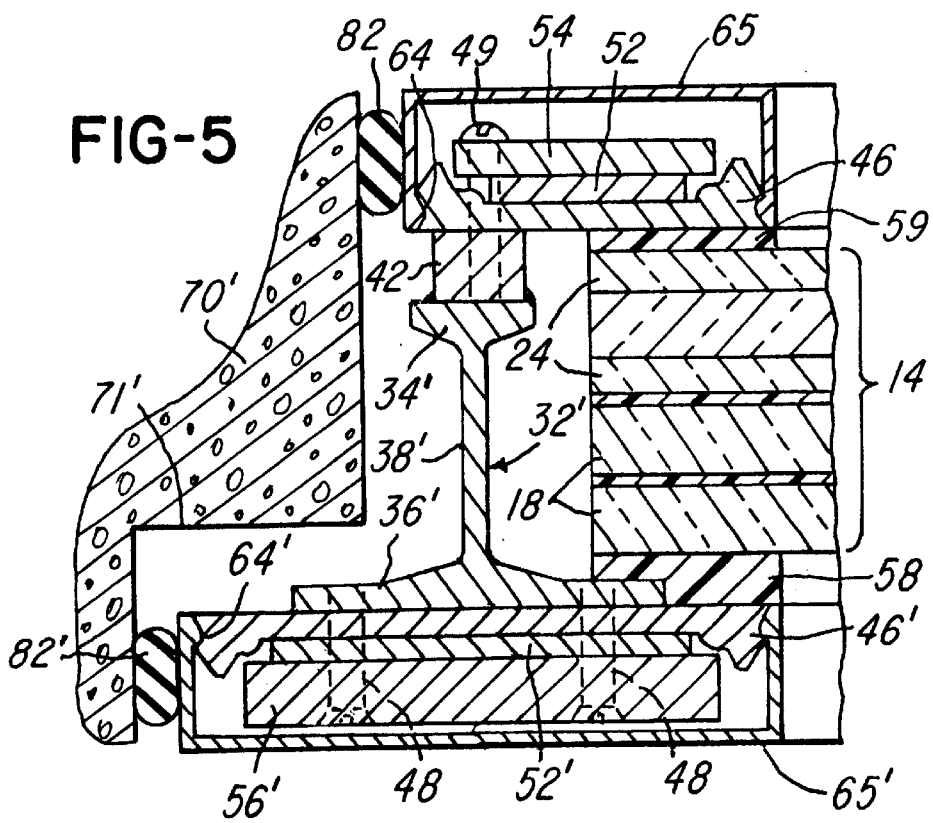

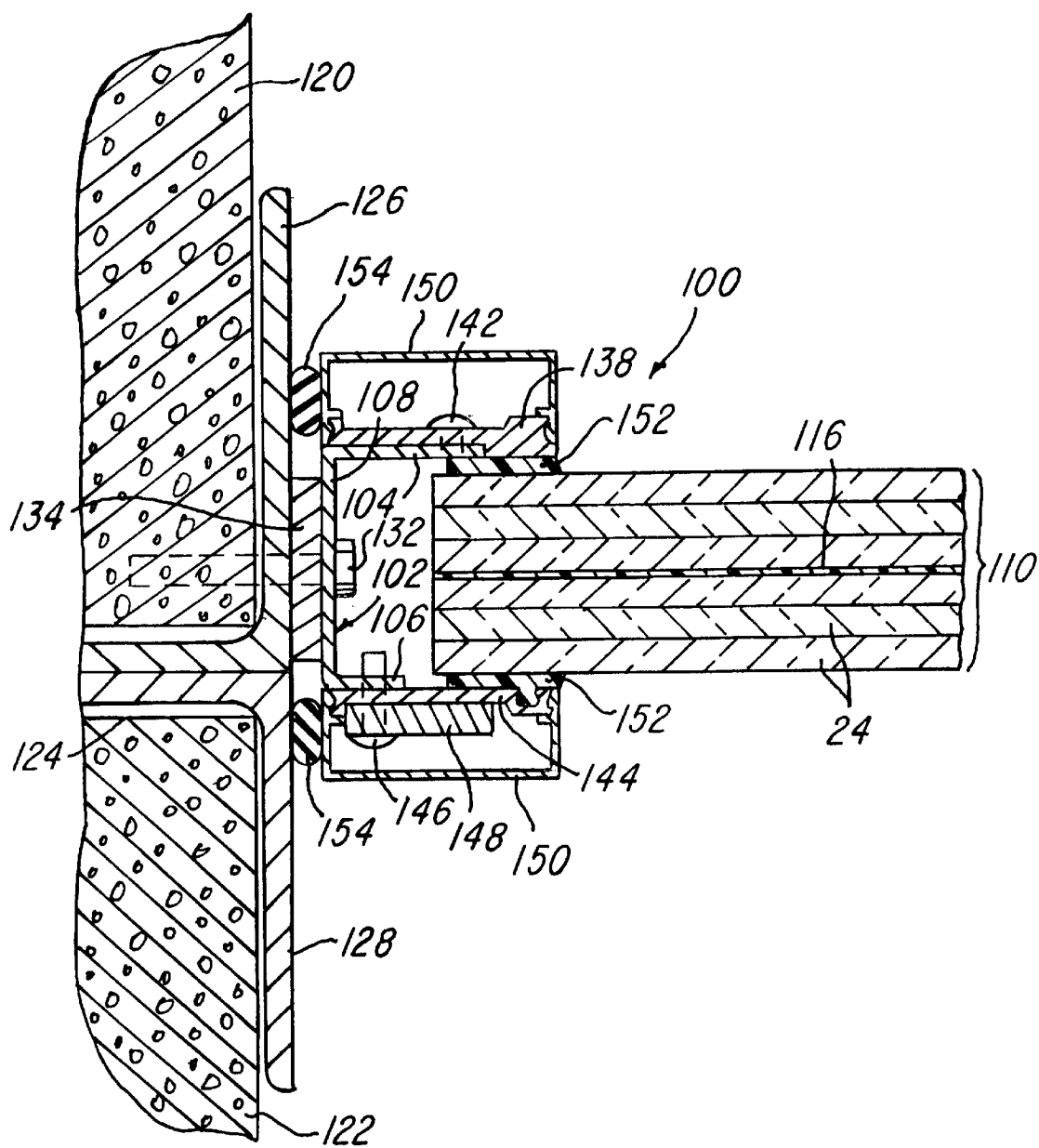

BULLET RESISTANT WINDOW ASSEMBLY

RELATED APPLICATION

This application is a continuation-in-part of patent application Ser. No. 08/901,750 filed Jul. 28, 1997, now U.S. Pat. No. 5,950,380.

BACKGROUND OF THE INVENTION

In the construction of bullet resistant window assemblies, a rectangular thick glass unit commonly includes multiple layers of glass and glass clad polycarbonate sheets, and the composition and thickness of the glass unit is selected according to the level of ballistic and bullet resistance desired. The glass unit is supported by various forms of surrounding frame systems which are commonly constructed from sections of aluminum extrusions attached to steel strips or by forming sheet steel into frame sections. Sometimes, the frame defines a chamber which is filled with concrete to provide a higher level of security. However, in the construction of a high security bullet resistant window assembly, it is desirable to have a relatively light weight and compact frame capable of the highest level or rating of bullet resistance, and also a frame which is neat and decorative in appearance and is easy to install along with the multiple layer glass unit. It is further desirable to provide a frame which may be economically constructed and which may be easily modified to accommodate glass units of different thicknesses and different sizes.

SUMMARY OF THE INVENTION

The present invention is directed to an improved bullet resistant window assembly which provides all of the desirable features mentioned above and which is especially adapted to provide a high level of resistance rating such as a NIJ Level 3 (National Institute of Justice). More specifically, the bullet resistant window assembly of the invention incorporates a frame system which provides a neat and clean exterior and interior appearance, is compact and relatively light weight, uses existing commercially available components and is easy to install within a wall opening.

In accordance with a preferred embodiment of the invention, a multiple layer bullet resistance glass unit is surrounded by a rectangular steel frame having a wide peripheral flange integrally connected to a narrow peripheral flange by a web. A set of spacer bars are welded to the narrow flange around the frame, and a set of extruded aluminum trim base strips extend around the frame and are secured by peripherally spaced screws to the spacer bars and the wide flange of the steel frame. The trim base strips capture a peripheral portion of the glass unit which is sealed to the base strips by glazing materials such as a silicone material and glazing tape. A set of steel reinforcing plates or strips are secured to the exterior and/or interior base plates by the peripherally spaced screws and overlap the steel frame and a peripheral portion of the glass unit. A set of extruded aluminum trim strips or channels are snap-fitted onto the base strips for enclosing the steel reinforcing strips and for providing the frame of the window unit with a clean, neat and decorative appearance.

Other features and advantages of the invention will be apparent from the following description, the accompanying drawings and the appended claims.

BRIEF DESCRIPTION OF THE DRAWINGS

FIG. 1 is an elevational view of a bullet resistant window assembly constructed in accordance with the invention;

FIG. 2 is a full size fragmentary section of the window assembly, taken generally on the line 2—2 of FIG. 1 and with a center portion broken away;

FIG. 3 is a full size fragmentary section of the window assembly, taken generally on the line 3—3 of FIG. 1, and with a center portion broken away;

FIG. 4 is a full size fragmentary section of a mullion, as taken generally on the line 4—4 of FIG. 1; and FIG. 5 is a full size fragmentary section similar to FIG. 2 and showing a modification of a window assembly constructed in accordance with the invention; and FIG. 6 is a fragmentary section similar to FIG. 5 and showing another modification of a window assembly constructed in accordance with the invention.

DESCRIPTION OF THE PREFERRED EMBODIMENTS

A bullet resistant window assembly 10 includes a generally rectangular frame assembly 12 surrounding a pair of multiple layer transparent glass units 14 which are separated by a mullion 16. However, it is to be understood that the frame 12 may be square and only one or more than two glass units 14 may be enclosed within the frame assembly 12. The construction of each glass unit 14 is shown in FIGS. 2–4 and commonly includes multiple layers of glass, such as the glass panels 18 and 19 and multiple layers of a transparent plastics material, such as the layers 22 and 24. It is to be understood that the specific construction of the glass unit 14 does not form any part of the present invention and is available from various sources such as the glass-clad polycarbonate security glass produced by HGP Industries, Inc. in Houston, Tex.

In accordance with the present invention, the frame 10 includes a rectangular frame member 32 of hot rolled steel and which includes a narrow peripheral flange 34 integrally connected to a wide peripheral flange 36 by a web 38. The four corners of the frame member 32 are mitered and welded together in a conventional manner, and a portion of the wide flange 36 is cut and removed to provide the frame member 32 with generally an L-shaped cross-sectional configuration. The hot rolled steel forming the frame member 32 is commercially available and is commonly used to form the frame of a non-ballistic window assembly having a single glass pane or panel or spaced glass panels to provide thermal insulation.

A set of steel spacer strips or bars 42 extend around the frame member 32 and are welded to the narrow flange 34. The width of the spacer bars 42 is selected to provide the combined frame member 32 and spacer bars 42 with an overall predetermined width selected according to the desired thickness of the glass unit 14. The steel bars 42 are commercially available in various thicknesses and provide an adjustable extension to the frame member 32 according to the thickness of the glass unit 14. When the desired thickness of the unit is generally the same as the thickness of the frame member 32, the spacer bars 42 are not required.

A set of extruded aluminum base trim strips or members 46 extend around the frame member 32 and are attached to the wide flange 36 and the spacer bars 42 by means of adhesive and peripherally spaced screws such as the flat head screws 48 and rounded head screws 49 which are threaded into the flange 36 and into tapped holes within the spacer bars 42. The screws 48 are hardened self tapping screws, and the inner end portions are broken off after threading through the flange 36.

The screws 48 and 49 also retain a set of steel reinforcing plates or strips 52, 54 and 56 which are recessed within cavities defined by the trim base members 46. Adhesive also attaches the base member 46 to the wide flange 36 and to the adjacent strips 52 and 56. While the steel reinforcing strips 52, 54 and 56 are shown attached to both sets of base members 46 around the frame member 32 to obtain the maximum level of security or bullet resistance, it is to be understood that if a lower level of security is desired, the steel reinforcing strips may be attached only on the interior or exterior set of base members 46 and not on both the interior and exterior sets of base members 46. As apparent from FIG. 2, the inner and outer sets of base members 46 capture a peripheral edge portion glass unit 14, and suitable sealing or glazing materials 58 and 59, such as a silicone compound and glazing tape, form fluid-tight seals between the base members 46 and the edge portion of the glass unit 14 around the frame 10.

As also shown in FIG. 2, each trim base strip or member 46 has opposite longitudinally extending undercut grooves or recesses 64 which provide a snap-fit connection or coupling with the legs of a corresponding set of extruded aluminum trim strips or channels 65. The inner and outer sets of trim channel 65 extend around the rectangular frame 12 and enclose the corresponding steel reinforcing plates or strips 52, 54 and 56. The extruded aluminum base members 46 and snap-on trim channel 65 are commercially available and are commonly used for curtainwall window assemblies having extruded aluminum frames. The trim channels 65 are preferably anodized and are available in various colors, and provide the security window assembly 10 with a clean, neat and attractive inner and outer appearance.

Referring to FIG. 3, the window assembly 10 is installed within a window opening defined by a building wall member 70 having a rectangular surface 71. After the sets of base members 46 and steel reinforcing strips 52 and 58 are attached to the wide flange 36, the steel frame member 32 is positioned within the opening on a series of rigid shim blocks 72 positioned along the bottom rail of the rectangular frame member 32. The frame member 32 is then secured to the wall member 70 by means of peripherally spaced fasteners such as a series of screws 74 which extend into anchors (not shown) within the wall member 70. Each glass unit 14 is then positioned within the frame member 32 with glazing tape adjacent the flange 36, and the glass units are placed on a hard rubber strip or pads 76 which rests on rigid spacer blocks or pads 78 supported by the web 38 along the bottom rail of the rectangular frame member 32.

The sets of inner base trim members 46 and the steel reinforcing plates 52 and 54 are attached to the frame member 32 and spacer bars 42 by the machine screws 49. After the glazing tape or sealing material 59 is installed, the sets of trim channels 65 are snap-fitted onto the base members 46. Strips 82 of backer rod and sealant are then inserted around the window assembly 10 between the outer surfaces of the trim channels 65 and the wall surface 71 to form fluid-tight seals between the window assembly 10 and the wall member 70.

As shown in FIG. 1, the rectangular window assembly 10 may include a mullion 16 which is shown in cross-section in FIG. 4. The construction of the mullion 16 is very similar to the construction of the peripheral. frame assembly 12 described above in connection with FIGS. 2 and 3. Accordingly, the same reference numbers are used for corresponding components, but with the addition of prime marks. As apparent, most of the components or members of the mullion are somewhat wider than the corresponding components in the frame assembly 12 so that the components overlap the opposing edge portions of the glass units 14. In addition, the hot rolled steel frame member 32' is symmetrical or T-shaped in cross-section, and the wide flange 36' has not been cut on one side. The upper and lower ends of the mullion frame member 32' are cut to the contour of the frame member 32 and are welded to the frame member 32.

Referring to FIG. 5, it is sometimes desirable to construct a window assembly 10' so that it may be installed within a wall opening having a stepped surface 71'. In this assembly, the hot rolled steel frame 32' receives the wider components as used in the mullion 16 for the exterior surface of the window assembly, while the narrower components, as described above in connection with FIG. 2, are used to form the interior of the frame assembly. As apparent from FIG. 5, the wide flange 36' of the frame member 32' and the sets of steel reinforcing members or strips 52' and 56' overlap not only the peripheral edge portion of the glass unit 14 but also a portion of the wall member 70' defining the stepped surface 71'. As a result, the modification of FIG. 5 provides somewhat higher security than the embodiment described above in connection with FIGS. 2 and 3.

Referring to FIG. 6 which illustrates another embodiment of the invention, a bullet resistant window assembly 100 includes a rectangular steel frame 102 having a channel shaped cross-sectional configuration and a uniform wall thickness. The frame includes a wide flange 104 and a narrow flange 106 integrally connected by a web 108. The frame 102 extends around the periphery of a glass unit 110 which is constructed similar to the glass unit 14 described above and includes multiple panels of glass panels and/or plastics separated by a transparent plastics layer 116. The rectangular frame 102 is supported by a masonry wall section 120 which cooperates with a wall section 122 to define a peripheral slot or groove 124. The groove 124 receives a set of steel lintel angles 126 and 128 which extend around the window assembly 100 and define the window opening. A series of peripherally spaced masonry screws 132 extend through the web 108 of the frame 102 and through spacer strips 134 into the wall section 120 for rigidly securing the frame 102 to the wall sections.

Extruded aluminum base trim strips 138 extend around the rectangular frame 102 and are secured to the wide flange 104 by a series of peripherally spaced hardened screws 142. Extruded aluminum base trim strips 144 are secured to the narrow flange 106 around the frame 102 by a series of peripherally spaced fasteners or hardened screws 146. The screws 146 also secure steel reinforcing strips 148 around the periphery of the frame 102, but the steel strips 148 may also be secured to the wide flange 104 by longer screws 142 or to only the wide flange 104. Both sets of base trim strips 138 and 144 receive snap-on extruded aluminum trim channels 150 which provide a neat and clean appearance. A glazing material 152, such as the silicone glazing material 58 described above, fills the space between the glass unit 110 and the base trim strips 138 and 144. Glazing strips or tapes 154 are also used to fill the gaps between the lintel angles 126 and 128 and the trim channels 150 around the periphery of the window assembly 100.

From the drawings and the above description, it is apparent that a security window assembly constructed in accordance with the present invention, provides desirable features and advantages. For example, the window assembly may be constructed with commercially available components, thereby minimizing the investment in tooling, and enabling smaller window companies to produce high level bullet resistant window units. The bullet resistant window assembly of the invention also provides a window frame assembly with the strength of steel and the beauty of aluminum since the aluminum trim channel 65 or 65' or 150 and supporting base strips are commercially available in different profiles and colors, thus providing for architectural freedom in the appearance of a bullet resistant window assembly. The sections of the frame 102 may be formed on a sheet metal break according to the thickness of the glass unit 110, and the narrow flange 106 permits installation of the glass unit 110 after the frame 102 is installed. In addition, the window assembly of the invention provides a compact and high strength frame assembly which is also adjustable and light weight relative to other frames used for high rating bullet resistant window units.

While the forms of window assembly herein described constitute preferred embodiments of the invention, it is to be understood that the invention is not limited to these precise forms, and that changes may be made therein without departing from the scope and spirit of the invention as defined in the appended claims.

The invention having thus been described, the following is claimed:

1. A bullet resistant window assembly adapted to be installed in an opening of a building wall, comprising a generally rectangular metal frame having a first elongated peripheral flange rigidly connected to a second peripheral flange by a longitudinally extending web, said first flange having a width substantially greater than a width of said second flange in lateral cross-section of said frame, elongated base strips secured to said first and second flanges around said frame, said base strips each having opposite edge portions, a plurality of metal reinforcing strips secured to said base strips around said frame, trim members having portions releasably connected to said edge portions of said base strips around said frame and enclosing said reinforcing strips, a multiple layer glass unit within said frame and surrounded by said frame, said glass unit having a peripheral portion confined between said base strips and laterally overlapping only said first flange of said first and second flanges, and said reinforcing strips laterally overlap said frame and said peripheral portion of said glass unit.

2. The window assembly as defined in claim 1 and including spacer bars secured to said second flange of said frame and having a thickness selected according to the thickness of said glass unit.

3. The window assembly as defined in claim 1 and including a glazing material extending around said frame between said glass unit and said base strips.

4. The window assembly as defined in claim 1 and including a snap-fit coupling between each of said trim members and the corresponding said base strip.

5. The window assembly as defined in claim 1 and including a continuous strip of sealant material surrounding each of said trim members for engaging a surface defining the opening in the building wall.

6. The window assembly as defined in claim 1 and including a mullion separating said glass unit into a plurality of said glass units, said mullion includes a linear metal mullion frame having a first flange and a second flange, said first flange of said mullion frame having a width substantially greater than a width of said second flange of said mullion frame, base strips secured to said first and second flanges of said mullion frame, a metal reinforcing strip secured to at least one of said mullion base strips, and a trim member secured to each of said mullion base strips.

7. The window assembly as defined in claim 1 wherein said frame has a generally C-shape cross-sectional configuration and a substantially uniform wall thickness.

8. The window assembly as defined in claim 1 wherein each of said base strips and trim members secured to said first flange has a width greater than a width of the corresponding said base strips and trim members secured to said second flange for mounting said window assembly into a stepped opening within the wall.

9. The window assembly as defined in claim 1 wherein said reinforcing strips are secured to each of said base strips adjacent said first and second flanges around said frame.

10. The window assembly as defined in claim 1 wherein said frame has generally an L-shape cross-sectional configuration.

11. The window assembly as defined in claim 1 wherein each of said base strips and trim channels secured to said first flange has a width greater than a width of the corresponding said base strips and trim channels secured to said second flange for mounting said window assembly into a stepped opening within the wall.

12. A bullet resistant window assembly adapted to be installed in an opening of a building wall, comprising a generally rectangular metal frame having a first elongated peripheral flange rigidly connected to a second peripheral flange by a longitudinally extending web, said first flange having a width substantially greater than a width of said second flange in lateral cross-section of said frame, elongated base strips secured to said first and second flanges around said frame, said base strips each having opposite edge portions, a plurality of metal reinforcing strips secured to said base strips around said frame, trim channels having leg portions releasably connected to said edge portions of said base strips around said frame and enclosing said reinforcing strips, a multiple layer glass unit within said frame and surrounded by said frame, said glass unit having a peripheral portion confined between said base strips and laterally overlapping only said first flange of said first and second flanges, and said reinforcing strips laterally overlap said frame and said peripheral portion of said glass unit.

13. The window assembly as defined in claim 12 and including spacer bars secured to said second flange of said frame and having a thickness selected according to the thickness of said glass unit.

14. The window assembly as defined in claim 12 and including a glazing material extending around said frame between said glass unit and said base strips.

15. The window assembly as defined in claim 12 and including a snap-fit coupling between each of said trim channels and the corresponding said base strip.

16. The window assembly as defined in claim 12 and including a mullion separating said glass unit into a plurality of said glass units, said mullion includes a linear metal mullion frame having a first flange and a second flange, said first flange of said mullion frame having a width substantially greater than a width of said second flange of said mullion frame, base strips secured to said first and second flanges of said mullion frame, a metal reinforcing strip secured to at least one of said mullion base strips, and a trim channel secured to each of said mullion base strips.

17. The window assembly as defined in claim 12 wherein said frame has a generally C-shape cross-sectional configuration and a substantially uniform wall thickness.

18. The window assembly as defined in claim 12 wherein said reinforcing strips are secured to each of said base strips adjacent said first and second flanges around said frame.

19. A bullet resistant window assembly adapted to be installed in an opening of a building wall, comprising a generally rectangular steel frame having a generally C-shaped cross-sectional configuration formed by a first elongated peripheral flange integrally connected to a second peripheral flange by a longitudinally extending web, said first flange having a width substantially greater than a width of said second flange in lateral cross-section of said frame, elongated metal base strips secured by a plurality of fasteners to said first and second flanges around said frame, said base strips each having opposite edge portions, a plurality of steel reinforcing strips secured to said base strips around said frame, metal trim channels having leg portions releasably connected to said edge portions of said base strips around said frame and enclosing said steel reinforcing strips, a multiple layer glass unit within said frame and surrounded by said frame, said glass unit having a peripheral portion confined between said base strips and laterally overlapping only said first flange of said first and second flanges, and said steel reinforcing strips laterally overlap said frame and said peripheral portion of said glass unit.

20. The window assembly as defined in claim 19 wherein said flanges and said web of said frame have a uniform thickness.

* * * * *